G. AMONSEN.
TRACTION ENGINE.
APPLICATION FILED MAY 24, 1915.
1,184,807.
Patented May 30, 1916.
2 SHEETS—SHEET 1.
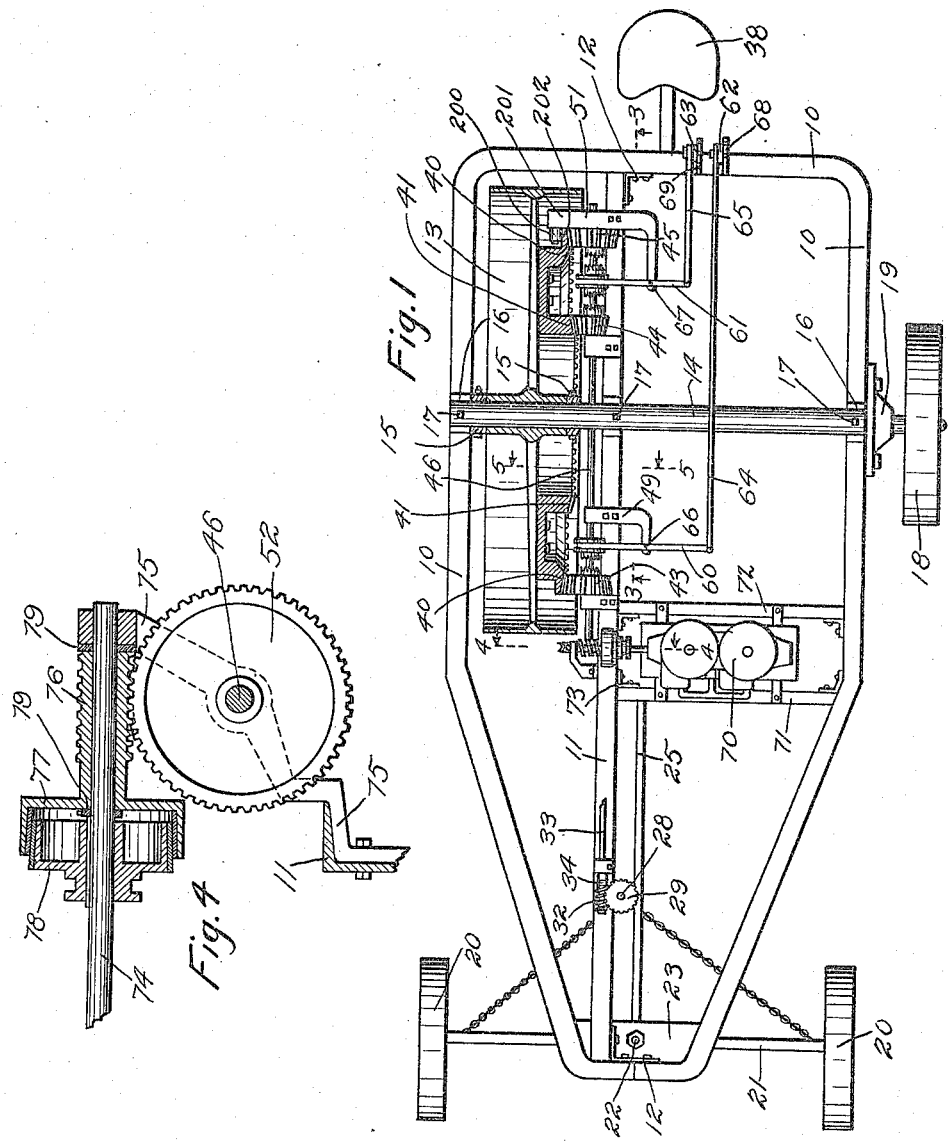
Witnesses:
Alex. Lagaard.
H. A. Bowman.
Inventor:
Gilbert Amonsen
By A. W. Whiteley
his Attorney.

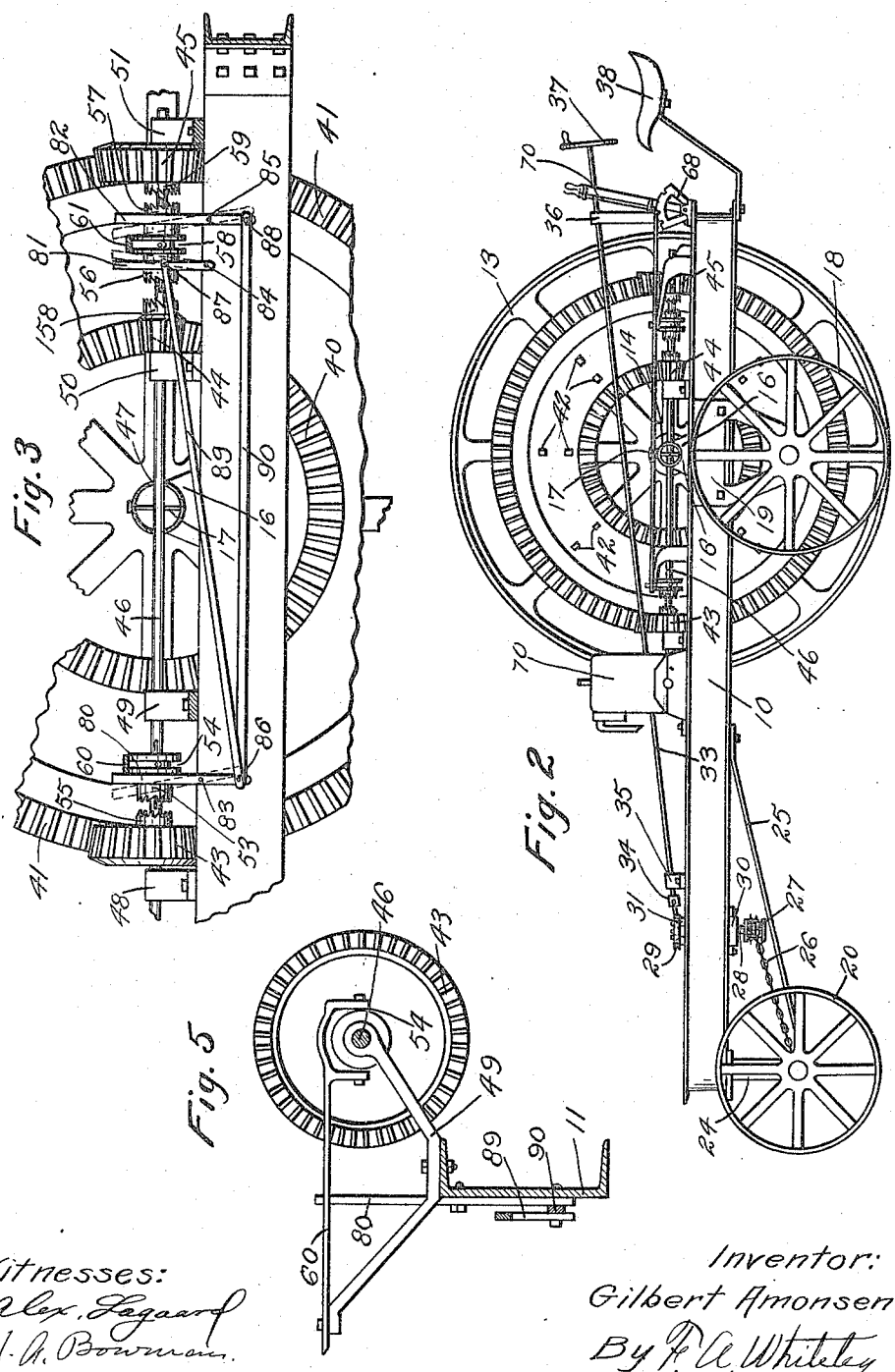

UNITED STATES PATENT OFFICE.

GILBERT AMONSEN, OF MINNEAPOLIS, MINNESOTA.

TRACTION-ENGINE.

1,184,807.

Specification of Letters Patent.

Patented May 30, 1916.

Application filed May 24, 1915. Serial No. 30,042.

*To all whom it may concern:*

Be it known that I, GILBERT AMONSEN, a citizen of the United States, residing at Minneapolis, in the county of Hennepin and State of Minnesota, have invented certain new and useful Improvements in Traction-Engines, of which the following is a specification.

My invention relates to traction engines and has for its object to provide a traction engine of very simple construction wherein the transmission elements are all mounted upon a single shaft, which, in turn, is driven directly from the crank shaft of the engine, preferably through a worm drive, thus enabling the necessary reduction in speed to take place without intervening gear.

It is a further object of my invention to employ a transmission shaft which shall extend through the axis of rotation of the traction wheel, preferably also directly through the transverse axle of the traction engine, the transmission gears on said shaft meshing directly with gears on the traction wheel, some of said transmission gears being on opposite sides of the axis of the wheel thereby permitting reverse.

The full objects and advantages of my invention will appear in connection with the detailed description thereof and are particularly pointed out in the claims.

In the drawings, illustrating the application of my invention in one form—Figure 1 is a plan view of my tractor. Fig. 2 is a side elevational view of the same. Fig. 3 is a vertical section taken on line 3—3 of Fig. 1 showing the transmission system and drawn to a larger scale. Fig. 4 is a vertical section through the engine shaft taken on line 4—4 of Fig. 1 drawn to a larger scale showing the engine drive and clutch. Fig. 5 is a vertical section taken on line 5—5 of Fig. 1 drawn to a larger scale.

The frame of my tractor is made of two main pieces of channel 10 and 11 fastened together by angles 12, as best shown in Fig. 1. Channel 10 is bent to form the outer member of the frame and has joined to it member 11, which latter member forms the support for the transmission system.

The wheels of my tractor consist of a large wide-faced drive wheel 13 mounted to rotate upon a large tubular shaft 14 between collars 15, said shaft being rigidly fixed to the frame 10 and 11 by blocks 16 and bolts 17, a smaller wheel 18 whose axle lies in the same vertical plane as shaft 14 and issues from a bracket casting 19, and steering wheels 20 mounted upon an oscillating axle 21. The axle 21 is pivoted by a king bolt 22 extending through a plate 23 riveted to the bottom of the frame and the axle itself. This axle is braced by a transverse V-brace 24 and a longitudinal brace 25 passing to the center of the frame. The front axle is oscillated and held in position by a chain 26, which chain is fastened to the axle 21 near its extremities and is wrapped several times about a drum 27 and fastened thereto so that as the drum is revolved one side of the chain unwinds and the other winds, thus keeping the chain the same length and causing the wheels and axle to oscillate. The drum 27 is rigidly pinned to a shaft 28 carrying at its upper extremity a worm wheel 29 and journaled in bearings 30 and 31 fastened to the top and bottom of the frame member 11. The bearing casting 31 also provides the bearings for a worm gear 32 rigidly mounted on a small shaft, said shaft being coupled to a steering rod 33 by means of a universal joint 34. Steering rod 33 revolves in bearings 35 and 36 and terminates in a hand wheel 37 in easy reach of the operator seated in the seat 38.

The transmission system of my tractor is very simple and is comprised of the following parts. An annular casting 39 consisting of bevel gears 40 and 41 is bolted to the spokes of drive wheel 13 by bolts 42. The gears 40 and 41 mesh with pinions 43, 44 and 45, all mounted to rotate loosely upon a shaft 46 by means of collars within their hubs, not shown in the drawings. The aforementioned gears and pinions are kept in mesh by means of a roller 200 pivoted on a pin screwed in a bracket 201 which is a part of a bearing 51, said roller operating against the back side 202 of gear 40. As will be readily conceived, shafts 46 and 14 must necessarily be in the same plane and at right angles to each other in order to effect this drive, and my method of accomplishing this is to provide the hollow shaft 14 rigidly mounted upon the frame 10 and 11 with apertures 47 for allowing the shaft 46 to pass through, as best shown in Fig. 3. This requires, as before mentioned, that wheel 13 be loosely mounted on said shaft 14 and that drive gears 40 and 41 be attached to wheel 13 instead of shaft 14.

Shaft 46 is journaled in bearings 48, 49, 50 and 51, all of which are bolted to frame member 11. Shaft 46 besides carrying pinions 43, 44 and 45, carries a worm wheel 52 rigidly keyed thereto at the extreme front end, a jaw clutch member 53 with a shifting groove 54 which clutch engages a similar jaw clutch member 55 cast as a part of pinion 43, and double jaw clutch members 56 and 57 with a shifting groove 58 which clutch members can engage with either of similar members 158 and 59 cast as parts of the pinions 44 and 45, said clutch members 53, 56 and 57 being splined to the shaft 46. Clutch members 53, 56 and 57 are shifted through the shifting grooves 54 and 58 by means of forked shifting levers 60 and 61, hand levers 62 and 63 and connecting links 64 and 65. The levers 60 and 61 are pivoted at points 66 and 67 on brackets cast on the bearings 49 and 51. Hand levers 62 and 63 are pivoted in brackets 68 and 69 bolted to frame 10 and have catches and catch rods 70 engaging with notches in segments cast on the brackets 68 and 69. The links 64 and 65 are loosely pivoted to the levers 60, 61 and 62, 63 to allow for side movement, since the levers are not all in the same plane.

The engine 70, as best shown in Fig. 1, is bolted to supports 71 and 72, said supports being attached to the frame members 11 and 12 by means of angles 73. An engine shaft 74, as best shown in Fig. 4, is supported at the end by a bracket bearing 75 bolted to the frame member 11 and carries a casting comprising a worm gear 76 and a friction clutch member 77 free to revolve on said shaft as well as a sliding friction clutch member 78 splined thereto. Clutch member 77 is prevented from sliding by collars 79 and clutch member 78 is shifted by means not shown in the drawings. Worm gear 76 meshes with the worm wheel 52 mounted on the end of shaft 46, and bracket 75 also gives a bearing to the end of the shaft 46, as shown by the dotted lines in Fig. 4.

In operating clutches 53, 56 and 57, if two of them should be engaged with their similar members stripping of gears might result, or at least the disadvantage of the engine stopping; and to obviate this, the following mechanism shown in Figs. 3 and 5 is used. Three vertical bars or levers 80, 81 and 82 are pivoted to the frame member 11 by means of bolts 83, 84 and 85. Lever 80 is connected from a point 86 to levers 81 and 82 at points 87 and 88 by means of connecting links 89 and 90, also pivoted to said levers at the points of connection. The mechanism is operated by the shift levers 60 and 61, which levers come in contact with and move the bars 80, 81 and 82 as the clutches are shifted as follows. In Fig. 3 both clutches are in the neutral position and the lever 80 is close up to shift lever 60. In this position lever 60 is obstructed from engaging clutch members 53 and 55 by means of rod 80 and shift lever 61 is free to engage clutch members 158 and 56 or 57 and 59. In the dotted-line position the levers 81 and 82 are both close up to shift lever 61 and so hold it in the neutral position while lever 80 is back, so that shift lever 60 is free to engage clutch members 55 and 53. It can readily be seen that the device is automatically operated by the shift levers 60 and 61 and if one clutch is engaged attempt to engage the one on the opposite side of the axle 14 will immediately cause the former to be disengaged.

As clearly evident from the description of my tractor, the two forward speeds are procured by the pinions 44 and 45, situated at the rear of the tractor. The benefits derived by this location are less wear and friction on the axle 14 and wheel 13, due to the fact that the gears 40 and 41 and wheel 13 are lifted off from their bearings when the tractor is running forward and hence friction and wear is reduced by the amount due to the weight of the frame and machinery supported on that axle, also sand and dirt coming down on the pinions while the same are running is thrown out from the meshing teeth instead of being ground in them.

I claim:

1. A traction engine comprising a frame, a transverse axle fast in said frame, a traction wheel journaled to rotate upon said axle, a plurality of gears on said traction wheel, a motor, a shaft driven from said motor extending along a diameter of said wheel and through said axle, pinions loose on said shaft at each side of the axle and in mesh with said gears, and means for clutching any of said pinions at will to rotate with the shaft.

2. A traction engine comprising a traction wheel, a plurality of gears on said traction wheel, a driven shaft extending along a diameter of said wheel and across a line coinciding with the axial center thereof, pinions loose on said shaft at each side of said axial center and in mesh with said gears, and means for clutching any of said pinions at will to rotate with the shaft.

3. A traction engine comprising a traction wheel, a plurality of gears on said traction wheel, a motor having the crank shaft thereof perpendicular to the plane of the traction wheel, a shaft driven from said motor extending along a diameter of said wheel and across a line coinciding with the axial center thereof, pinions loose on said shaft at each side of said axial center and in mesh with said gears, and means for clutching any of said pinions at will to rotate with the shaft.

4. A traction engine comprising a traction wheel, a plurality of gears on said traction wheel, a motor having the crank shaft thereof perpendicular to the plane of the traction wheel, a shaft extending along a diameter of said wheel and across a line coinciding with the axial center thereof, a worm on the crank shaft, a worm wheel on said last named shaft meshing with said worm, pinions on the last named shaft at each side of said axial center thereof, and means for clutching any of said pinions at will to rotate with the shaft.

5. A traction engine comprising a frame, a transverse axle fast on said frame, a traction wheel journaled to rotate upon said axle, a gear on said traction wheel, a driven shaft extending along a diameter of said wheel and through said axle, a pinion loose on said shaft at each side of the axle, both of said pinions meshing with said gear, and means for clutching either of said pinions at will to rotate with the shaft to drive the traction wheel in a forward or reverse direction as desired.

6. A traction engine comprising a frame, a transverse axle fast on said frame, a traction wheel journaled to rotate upon said axle, a gear on said traction wheel, a shaft extending along the diameter of said wheel and through said axle, a pinion loose on said shaft at each side of the axle, both of said pinions meshing with said gear, means for clutching either of said pinions at will to rotate the shaft, a motor having its crank shaft extending at right angles to said shaft, and a direct worm gear connection between the crank shaft and the first named shaft for driving the latter.

7. A traction engine comprising a frame, a transverse axle fast on said frame, a traction wheel journaled to rotate upon said axle, two gears on said traction wheel, a shaft extending along the diameter of said wheel and through said axle, a pinion loose on said shaft at the front thereof meshing with one of said gears, two pinions loose on said shaft at the rear thereof, one of the last named pinions meshing with one of the previously mentioned gears and the other of the last named pinions meshing with other of the previously mentioned gears, means for clutching any of said pinions to said shaft, means in the form of levers and links for preventing the clutching of two of said pinions at once to said shaft, and a direct worm gear connection between the crank shaft and the first named shaft for driving the same.

In testimony whereof I affix my signature in presence of two witnesses.

GILBERT AMONSEN

Witnesses:
ALEX LAGAARD,
H. A. BOWMAN.

Copies of this patent may be obtained for five cents each, by addressing the "Commissioner of Patents, Washington, D. C."